Nov. 12, 1929.  E. L. RAGONNET  1,735,129
UNIVERSAL TORCH MACHINE
Filed May 9, 1928    2 Sheets-Sheet 1
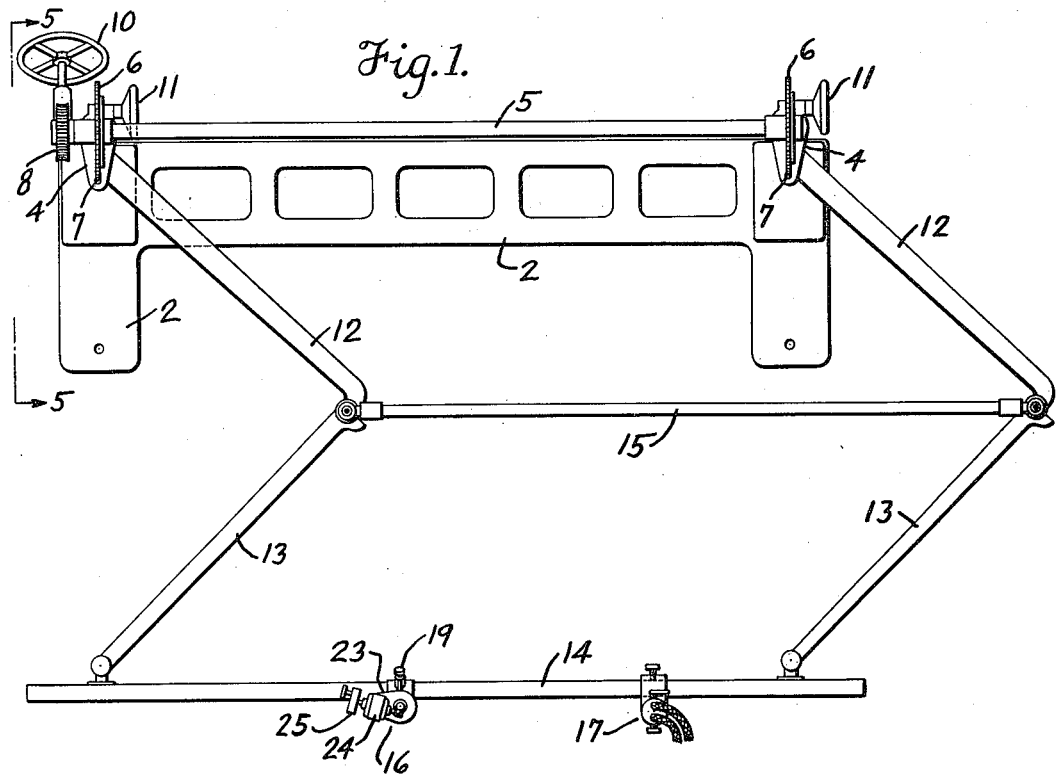
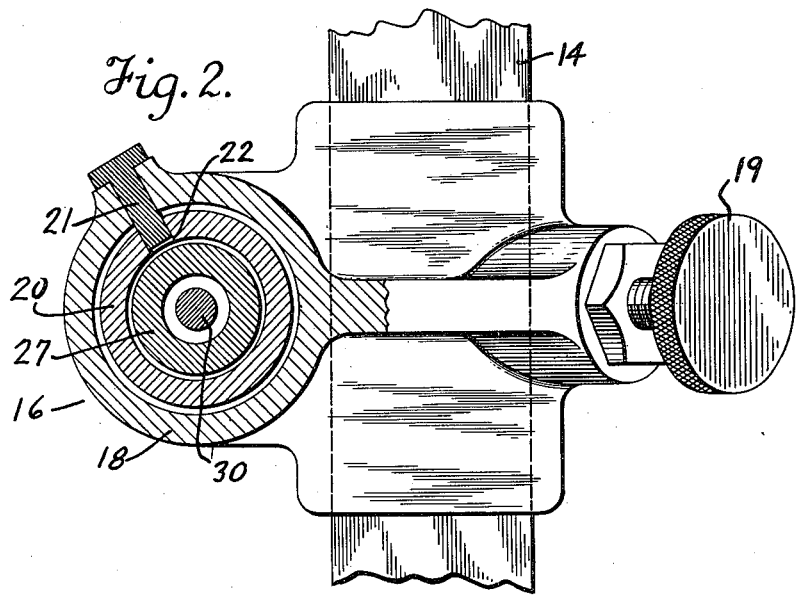
INVENTOR
Eugene L. Ragonnet
BY
ATTORNEY Nov. 12, 1929.  E. L. RAGONNET  1,735,129
UNIVERSAL TORCH MACHINE
Filed May 9, 1928   2 Sheets-Sheet 2
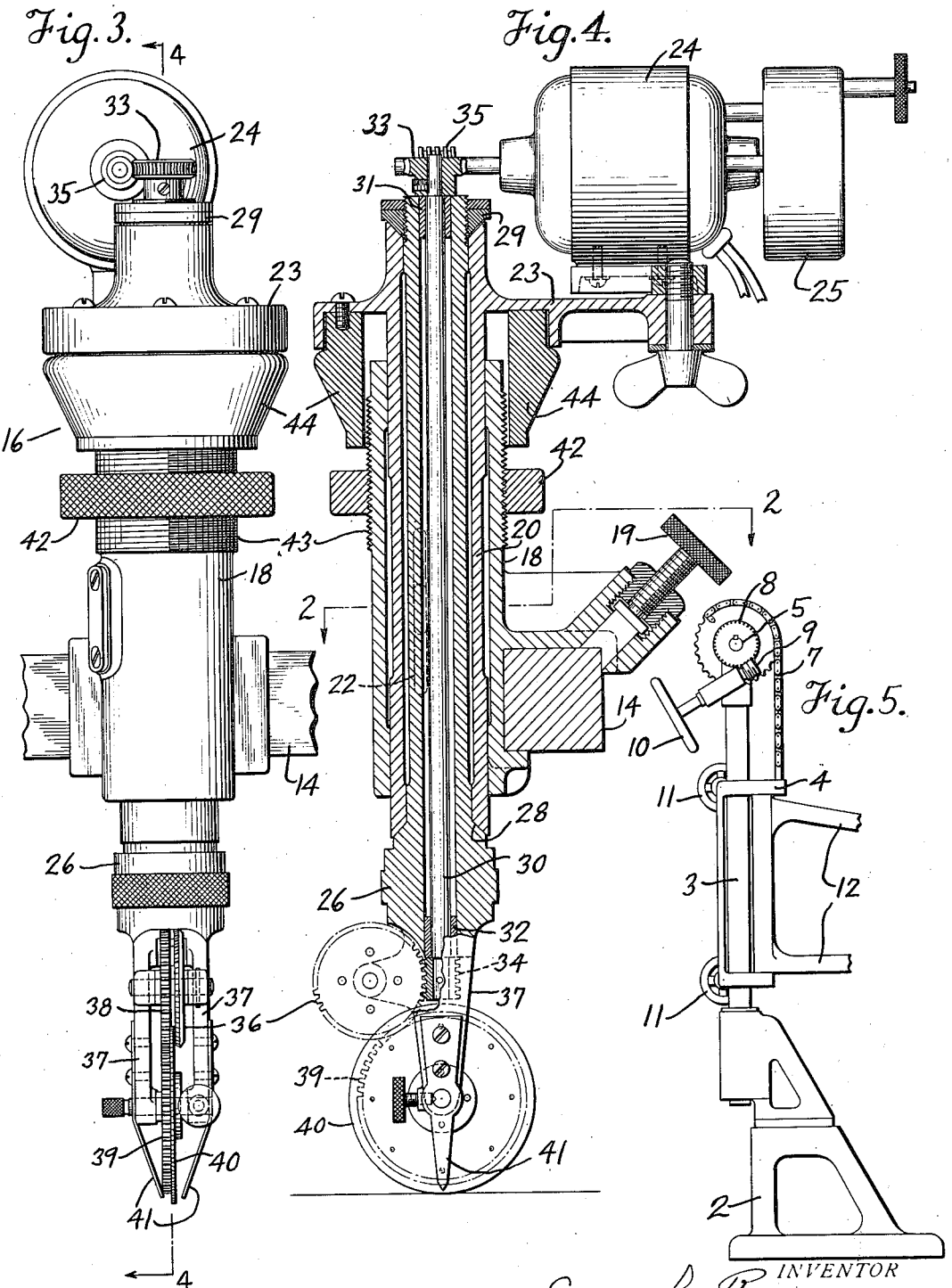

Patented Nov. 12, 1929

1,735,129

UNITED STATES PATENT OFFICE

EUGENE L. RAGONNET, OF NEW YORK, N. Y., ASSIGNOR TO AIR REDUCTION COMPANY, INCORPORATED, OF NEW YORK, N. Y., A CORPORATION OF NEW YORK

UNIVERSAL TORCH MACHINE

Application filed May 9, 1928. Serial No. 276,365.

Apparatus or machines are known whereby a gas cutting torch is mechanically propelled in any desired and changing directions at substantially uniform speed to make cuts of all descriptions in metal, the torch being connected with a suitable frame or support which is universally movable in a plane, and the propulsion of the preheating and cutting jets over the desired regular or irregular course being obtainable by driving a rolling tracer. In some apparatus the tracer is of a character to be guided over a drawing, and in others a tracer adapted to follow some form of template is employed.
An object of the invention is to improve apparatus suitable for such purposes, and a special object is to provide the apparatus, irrespective of its specific form, with an improved and more convenient tracing and driving unit, connected in an advantageous manner with the universally movable support.

In the accompanying drawings forming part hereof:

Fig. 1 is a plan view of a machine to which the invention is applied;

Fig. 2 is a horizontal section on a larger scale taken on the line 2—2 of Fig. 4;

Fig. 3 is an elevation of the tracer unit mounted on the support, a portion of which is shown;

Fig. 4 is a vertical section taken on the line 4—4 of Fig. 3; and

Fig. 5 is a fragmentary elevation looking in the direction of the line 5—5 of Fig. 1, on the same scale with said view.

A suitable base 2 carries a pair of rear columns 3 (one shown in Fig. 5), on which carriers 4 can be raised and lowered. A shaft 5 journaled in the tops of the columns and bearing a pair of sprocket wheels 6 connected with the carriers 4 by chains 7 enables the carriers to be raised and lowered together, the shaft 5 being provided with a worm wheel 8 meshed by a worm 9 on the shaft of a hand-wheel 10.
The carriers can be locked to the columns at any height by screw clamp devices 11.

Pivoted to the carriers 4 are arms 12 to which are pivoted other arms 13, the arms 13 being pivoted to a bar 14 and the pivot joints between the arms being connected by a rod 15, A tracer, designated as a whole by the numeral 16, is connected with the bar 14, and an oxyacetylene or similar metal-cutting torch 17 is mounted on the same bar.

The arms and their connections constitute a known form of support universally movable in a plane. The invention is equally applicable to other forms of universally movable frames whereby a cutting or welding torch can be moved in conformity with the movements of a tracer, whether the movements be on the same scale or on a different scale.

The frame with its torch and tracer are adapted to operate over a suitable work support (not shown) and over a drawing, template or pattern supported in a suitable manner.

A vertical tubular bearing 18 for the tracer is fixed to the bar 14. This bearing or guide can be secured to the bar at any point along its length by means of a screw clamp fitting 19, and the torch is also positionable at any desired point on the bar.

A part in the form of a sleeve 20 extends through the bearing 18, and is freely movable vertically in the bearing relatively to the universally movable frame. Rotation of this part relatively to the frame is prevented, or at least limited, as by a pin 21 which projects inwardly from the bearing 18 into a vertical slot 22 in the sleeve 20.

On the upper end of the freely vertically movable part 20 there is a platform 23 which serves for the support of an electric motor 24, which is provided, as usual, with some form of speed regulator and governor 25.

A tracer holder 26 has a hollow stem 27 which passes through the sleve 20 and is capable of swiveling freely therein. A shoulder 28 on the lower portion of the tracer holder bearing against the lower end of the sleeve 20, and a nut 29 on the upper end of the stem bearing against the upper end of the stem, keep the tracer holder from moving vertically with reference to the sleeve and compel it to partake of vertical movement therewith.

A shaft 30 passes vertically and axially through the swiveled hollow stem 27 of the tracer holder to turn in suitable bearings 31,

32 therein. A worm wheel 33 on the upper end of this shaft and a worm 34 on the lower end keep the shaft from moving vertically relatively to the tracer holder and cause it to move vertically with the tracer holder and with the sleeve 27.

The worm wheel 33 fixed to the upper end of the shaft 30 is engaged by a worm 35 on the shaft of the driving motor.

The worm 34 on the lower end of the shaft 30 engages a worm wheel 36, which turns on an axle supported between spaced side members 37 of the lower portion of the tracer holder. A gear 38 united with the worm wheel 36 meshes a gear 39 with which is united a tracer wheel 40 mounted to turn on a horizontal axle in said portion of the tracer holder. A pointer 41 on the tracer holder alongside the tracer assists in steering the tracer over the lines of a drawing.

This particular form of tracer wheel, which is both a tracing element and a driving wheel, adapted to operate on an underlying surface parallel with the horizontal plane of movement of the supporting frame, is known, and is preferably employed in combination with the present tracer structure and the present mode of connecting the same with the frame. However, other forms of tracers are also known, some having more than one wheel, some in which one element is the tracer proper and another rotating element the driver, and some in which an element or elements on vertical axes coact with one or another form of template. I do not, therefore, limit myself to the particular form of tracing and driving element shown, and it is to be understood that the expression driven tracer used in the claims is generic.

The universally movable frame or support is comparatively stiff in the vertical direction. The tracer structure, which is freely movable in the vertical direction relatively to the frame, rests by gravity upon the underlying plane surface or upon a suitable template, or is otherwise pressed downward. Consequently it travels easily and with proper traction irrespective of any unevenness in the vertical sense in the surface supporting the drawing or in the template, and irrespective also of any vertical flexing or gravitational effect of the frame. The mounting of the motor on the vertically freely movable tracer unit causes the weight of the motor to contribute in pressing the tracer downward and also permits of the simplest connection between the motor and the shaft 30.

The operation can be stopped at any point simply by lifting the tracer as a whole in relation to the frame. At the start of an operation, the tracer is held up out of contact with the drawing or template until the desired moment for commencing travel at uniform speed, and is then allowed to descend at the selected spot from which such travel is to start, the torch thereafter being compelled to execute movements corresponding to those of the tracer.

A knurled hand nut 42 is capable of being screwed up and down on a screw-thread 43 on the bearing 18 to any desired adjusted position. This device constitutes a stop for limiting the downward movement of the tracer relative to the frame, for example when there is no surface or template present for the tracer to rest on. By moving this part upward sufficiently it will also support the tracer in a raised position clear of such surface or template when desired. The platform 23 is provided with a downwardly projecting collar 44, with which the nut 42 may coact.

It will be understood that the precise form and details of the embodiment of the invention may be varied within the scope of the claims. As there may be other applications for a tracer of this character connected as described with a universally movable support for an instrumentality to be propelled through a predetermined path of irregular or changing direction, the invention is not necessarily limited to the application indicated.

I claim:

1. An apparatus of the character described comprising a torch supporting frame universally movable in a plane, a part connected with said support so as to be freely movable perpendicularly in relation to said support, a driving motor mounted on said part and movable perpendicularly therewith, and driven tracer means connected with said part so as to be movable perpendicularly therewith.

2. An apparatus of the character described comprising a support universally movable in a plane, a part connected with said support so as to be movable perpendicularly in relation to said support, means preventing rotation of said part relatively to said support, a driving motor mounted on said support and movable perpendicularly therewith, and driven tracer means connected with said part and also movable perpendicularly therewith.

3. An apparatus of the character described comprising a support universally movable in a plane, a part connected with said support so as to be freely movable perpendicularly in relation to said support, a driving motor mounted on said part and movably perpendicularly therewith, a tracer holder swiveled to turn freely relatively to said part and to move perpendicularly therewith, and a driven tracer carried by said tracer holder.

4. An apparatus of the character described comprising a support universally movable in a plane, a part connected with said support so as to be freely movable perpendicularly in relation to said support, means preventing rotation of said part in relation to said support, a driving motor mounted on said part and movable perpendicularly therewith, a tracer holder swiveled to turn freely relatively to said part and to move perpendicularly therewith, a driven tracer carried by said tracer holder, and means comprising a perpendicular driving shaft coaxial with said swiveled tracer holder through which said tracer is driven from said motor, said shaft being movable perpendicularly with said part and said tracer holder.

5. An apparatus of the character described comprising a support universally movable in a plane, a perpendicular bearing on said support, a sleeve freely movable perpendicularly in said bearing, a driving motor mounted on said sleeve and movable perpendicularly therewith, a tracer holder having a hollow stem swiveled in said sleeve so as to be movable perpendicularly therewith, a driven tracer carried by said tracer holder, and means comprising a vertical shaft passing coaxially of said tracer holder through which said tracer is driven from said motor, said shaft being movable perpendicularly with said sleeve and tracer holder.

6. An apparatus of the character described comprising a support universally movable in a plane, a perpendicular bearing on said support, a sleeve freely movable perpendicularly in said bearing, means preventing rotation of said sleeve in relation to said bearing, a driving motor mounted on said sleeve and movable perpendicularly therewith, a tracer holder having a hollow stem swiveled in said sleeve so as to be movable perpendicularly therewith, a driven tracer carried by said tracer holder, and means comprising a vertical shaft passing coaxially of said tracer holder through which said tracer is driven from said motor, said shaft being movable perpendicularly with said sleeve and tracer holder.

7. An apparatus of the character described comprising a support universally movable in a plane, a part connected with said support so as to be freely movable perpendicularly in relation to said support, means preventing rotation of said part in relation to said support, a driving motor mounted on said part and movable perpendicularly therewith, a holder swiveled to turn freely relatively to said part and to move perpendicularly therewith, a wheel device carried by said holder so as to turn on an axis parallel with said plane and roll on a plane surface, and means for driving said wheel from said motor.

8. An apparatus of the character described comprising a support universally movable in a plane, a part connected with said support so as to be freely movable vertically in relation thereto, a driving motor mounted on said part and movable vertically therewith, a tracer holder swiveled to turn freely relatively to said part and to move vertically therewith, a driven tracer carried by said holder, and means for supporting said part in a raised position.

9. An apparatus of the character described comprising a support universally movable in a plane, a part connected with said support so as to be freely movable vertically in relation thereto, a driving motor mounted on said part and movable vertically therewith, a tracer holder swiveled to turn freely relatively to said part and to move vertically therewith, a driven tracer carried by said holder, and a vertically adjustable stop for limiting downward movement of said part in relation to said support.

10. The combination with a frame universally movable in a plane, and a torch on said frame, of a driven tracer unit freely movable perpendicularly on said support and comprising swiveled and non-swiveled portions, the non-swiveled portion of the vertically movable tracer unit carrying a driving motor.

11. The combination with a frame universally movable in a plane, and a torch on said frame, of a driven tracer unit freely movable perpendicularly on said frame and carrying a driving motor.

EUGENE L. RAGONNET.